Figure 1:
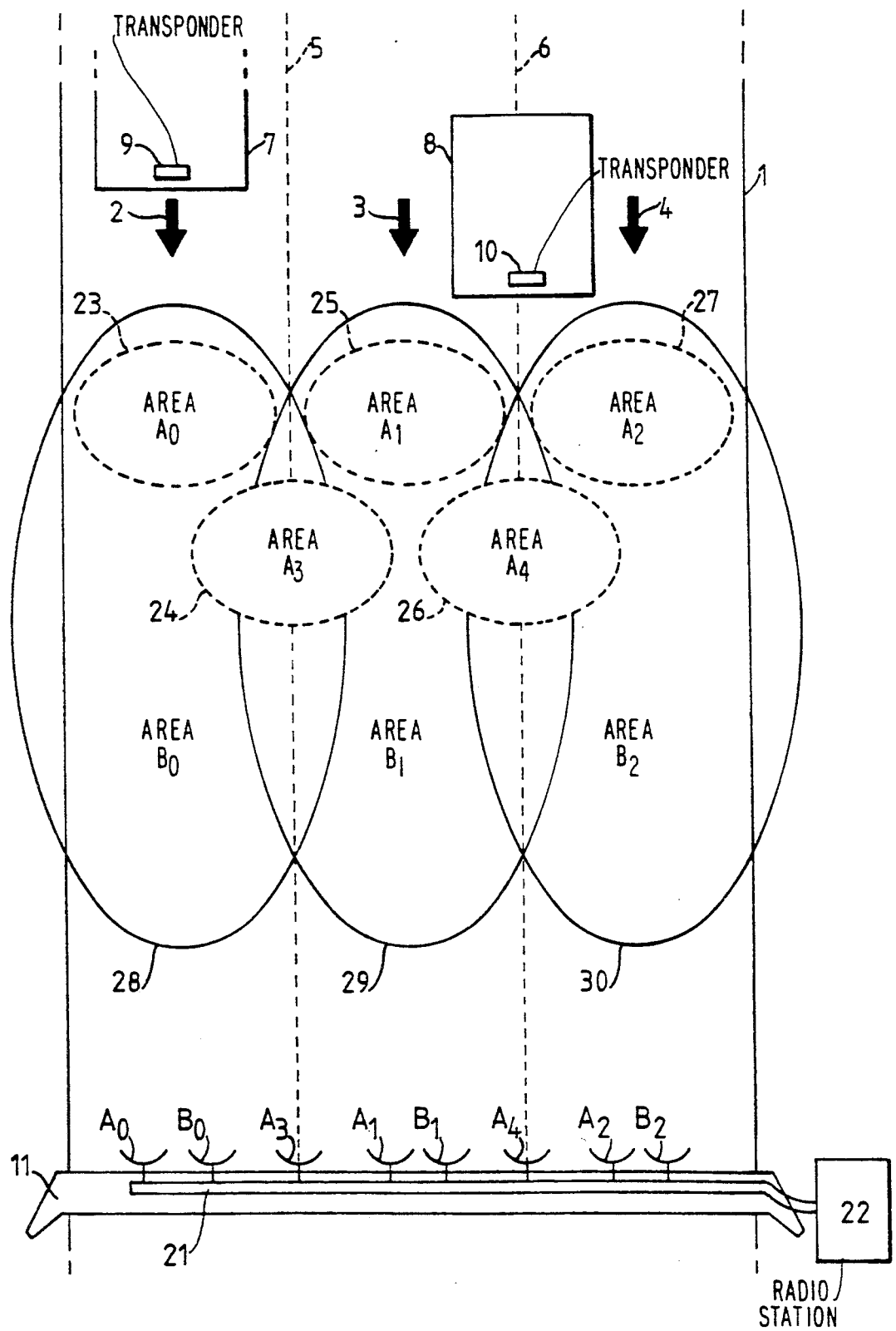

United States Patent [19]

Dadds et al.

[11] Patent Number: 5,128,669
[45] Date of Patent: Jul. 7, 1992

[54] COMMUNICATING INFORMATION BY RADIO

[75] Inventors: Alan F. Dadds, Hartfield; Kenneth Holford, Crawley; David M. Nugent, Bugbrooke; Brian J. Stocker, South Croydon, all of England

[73] Assignee: U.S. Philips Corporation, New York, N.Y.

[21] Appl. No.: 575,113

[22] Filed: Aug. 30, 1990

[30] Foreign Application Priority Data

Sep. 4, 1989 [GB] United Kingdom ............ 8919950

[51] Int. Cl.$^5$ ............................................. G08G 1/00
[52] U.S. Cl. ................................. 340/901; 340/905; 342/42; 342/51; 455/89
[58] Field of Search .......... 340/901, 905, 933; 455/33, 54, 89; 342/42, 44, 70, 51

[56] References Cited

U.S. PATENT DOCUMENTS 4,025,791  5/1977  Lennington et al. ............. 342/44 X
4,075,632  2/1978  Boldwin et al. .................. 455/92 X

FOREIGN PATENT DOCUMENTS 0024010  7/1980  European Pat. Off.

Primary Examiner—Jin F. Ng
Assistant Examiner—Jeffery A. Hofsass
Attorney, Agent, or Firm—David R. Treacy

[57] ABSTRACT

Information is communicated by microwave radio between transponders (9,10) carried by vehicles (7,8) travelling on a road (1) and a station (22) adjacent the road. The communications from the transponders are effected by the transponders suitably modulating their reflections of beams of microwave energy transmitted by the station from aerials (B) mounted on a gantry (11) above the road, these aerials irradiating respective communication areas (28,29,30). In order to prevent communications from different transponders overlapping and hence interfering with each other the transponders are enabled for their communications by microwave energy from further aerials (A), which energy has a higher frequency to enable it to be beamed at relatively small respective activation areas (23-27) the sizes of which are such that they can each only contain one vehicle and hence one transponder at any given time. The further aerials are activated, one at a time, successively and cyclically, so that the transponders are necessarily enabled in succession, the activation rate being, moreover, sufficient to ensure that all transponders passing through the relevant stretch of road are in fact enabled. During each interval between the activation of each further aerial and the next the station transmits a command from the aerial(s) (B) associated with the further aerial (A) which has just been activated ordering any transponder which has just been enabled to communicate its presence. If it receives such a communication the station transmits an address code from the relevant aerial(s) (B) which is stored in the relevant transponder and used subsequently to selectively address that transponder for further communication.

18 Claims, 3 Drawing Sheets

COMMUNICATING INFORMATION BY RADIO

This invention relates to a method of communicating information by radio between mobile transponders and a fixed station, in which method the station irradiates first and second portions of a path for said transponders by a first beam of microwave energy and a second beam of radio energy respectively, the energy of said beams having first and second frequencies respectively, the microwave energy having the first frequency activates each said transponder when that transponder is present within the first portion, information is subsequently communicated from that transponder to the station, and information is communicated to each transponder from the station by the station modulating the second beam. The invention also relates to an information transmission system for implementing such a method and a transponder for use in such a system.

A known such method disclosed in EP-A-0 024 010 is used to detect vehicles travelling on a road and effect the communication of information between them and a fixed station adjacent the road. To this end the first beam is used to effect the detection by means of radar techniques when a vehicle lies within the first portion and, in addition, activates a transmitter in the vehicle in such a manner that it is triggered thereby to transmit coded destination information to the station. The first portion is sufficiently small that not more than one vehicle can be present therein at any given time, thereby preventing more than one vehicle transmitter from being activated simultaneously (which would result in their transmission clashing). The second beam is used to transmit route recommendations to a vehicle when it lies within the second portion, any given vehicle passing through the second portion prior to entering the first. The method may be performed with respect to a plurality of adjacent lanes on a multi-lane highway, a respective first beam being provided corresponding to each lane and these beams being activated cyclically so that not more than one vehicle transmitter is activated at any given time.

Whereas the known method is satisfactory for the purpose envisaged, i.e. the indiscriminate broadcast transmission of route recommendations to all vehicles from a fixed station and the transmission of destination information from each vehicle to the fixed station, it cannot be used as it stands for two-way information transfer between the fixed station and specific vehicles. Moreover, the transmit/receive equipment in each vehicle tends to be rather costly, due in part to the fact that the vehicle transmissions are active ones, radio frequency power being generated in the vehicles themselves. This last fact also means that there is significant power consumption from an on-board supply which militates against the transmit/receive equipment being powered by its own internal batteries. The fact that the equipment also has to be in a state of constant readiness to receive the route recommendation has the same effect. These can be significant disadvantages when information transfer is required for certain other purposes between a fixed station and vehicles travelling relative thereto, as will become evident hereinafter, and it is an object of the present invention to enable these disadvantages to be mitigated.

According to one aspect of the invention a method as defined in the first paragraph is characterized in that said first and second portions overlap, said second frequency is lower than said first frequency, the microwave energy having the first frequency enables each said transponder for communication when that transponder is present within the first portion, communication of information from each activated transponder to the fixed station is achieved by the relevant transponder modulating its reflection of a beam of radio energy with which the station irradiates said second portion, which radio energy has a frequency which is lower than said first frequency, said second beam periodically carries modulation having a specific nature, information is first communicated to the station by any newly enabled transponder in response to reception by that transponder of the modulation having the specific nature, a specific address code is communicated between the station and each newly enabled transponder, and the station subsequently modulates said second beam to communicate further information to each enabled transponder using the specific address code to address the relevant transponder.

It has now been recognized that a method as defined in the first paragraph can provide two-way information transfer between the fixed station and specific transponders, while allowing the cost of, and the power consumption by, the individual transponders to be reduced, if it can be arranged that all transponders within communication range of the fixed station at any given time have or are assigned specific address codes which are known to the fixed station. If this is the case then these address codes can be used by the fixed station to address information, including commands, to specific transponders, which in turn enables the fixed station to be in complete control of which transponder is communicating information at any given time, and in particular to prevent more than one transponder from communicating information at any given time. (First communications from the various transponders (for which the address codes will not be usable for control purposes) can be prevented from clashing by arranging that these only occur in response to modulation having a specific nature periodically provided on the second beam and that the said first portion of the path is sufficiently small that only one transponder can be enabled therein between each occurrence of the said modulation and the next).

Preventing more than one transponder from communicating information at any given time allows the communications from the transponders to be achieved by the transponders modulating their reflection of a beam of radio energy with which the station irradiates the said second portion of the path, such a process entailing only small consumption of power by the transponders (because they themselves do not have to generate r.f. power) and requiring only comparatively low-cost circuitry. Moreover, arranging that the first communications from the newly activated transponders only occur in response to modulation having a specific nature periodically provided on the second beam, rather than immediately upon activation, allows the transponders to be constructed to adopt a quiescent state, in which their power consumption is very low indeed, at times when they are not in an activated or enabled state due to having experienced the microwave energy of the first beam. This could not easily be done if the transponders communicated directly in response to the microwave energy having the first frequency, because the times of such responses would be unpredictable, even if the microwave beam were pulsed, due to the inevitable spreads in the response times to said energy, making possible clashes between the responses of different transponders. In the quiescent state the only active part of the transponder need be that which is required to receive and react to the energy having the first frequency.

Making the first portion of the path which is illuminated by the first beam of microwave energy sufficiently small that only one transponder can be activated or enabled therein between each occurrence of the modulation having the specific nature and the next is facilitated if the frequency of this energy (the "first frequency") is chosen to be high, preferably greater than 9 GHz, for example approximately 24 GHz, in the case of transponder-carrying vehicles travelling along a road. However, such a frequency is not very suitable for the purposes of the ensuing communications between fixed station and transponders due to the inevitably low signal-to-noise ratio obtainable at this frequency. A lower carrier frequency or frequencies is/are therefore chosen for the purposes of these communications, the first frequency being preferably at least three times the or each frequency used for communication (the latter frequency(ies) being preferably less than 3 GHz, for example approximately 2.4 GHz).

There are several possibilities for the communication of the specific address codes between the fixed station and the newly activated or enabled transponders. As a first example each transponder may be preassigned its own unique such code and include this in its first communication to the fixed station in response to the modulation having the specific nature. However this may be open to objection on the grounds of violation of privacy, the communicated code constituting a unique and relatively permanent identifier of the relevant transponder. Preferably, therefore, each newly activated or enabled transponder is assigned a (temporary) address code by the fixed station. This could be communicated as part of the "modulation having a specific nature", its reception by a transponder being acknowledged in the first communication from that transponder to the fixed station and causing a new code to be chosen by the fixed station. However such a solution can give rise to problems if, for some reason, the acknowledgement fails to reach the fixed station (which might result in the same code being assigned to more than one transponder). Preferably, therefore, the specific address is communicated by the station to a newly activated or enabled transponder in response to reception by the station of the first communication from that transponder.

If full duplex communication is required between the fixed station and each transponder, the beam whose reflection is modulated and said second beam will have to be distinct if crosstalk is to be avoided. However in many cases half-duplex operation will suffice, in which case these beams can be one and the same.

A method in accordance with the invention may be performed with respect to each of a plurality of paths for mobile transponders, for example carried by respective vehicles travelling along a multi-lane highway, a respective said first beam being provided corresponding to each said path. If this is done then, for example, the respective first beams may be activated cyclically and successively with intervals therebetween, thereby ensuring that only one transponder becomes activated at any given instant, as in the prior art method discussed hereinbefore. By arranging that the activations occur at a sufficiently rapid rate it can also be ensured that at least one activation of the relevant first beam necessarily occurs during the interval when a transponder is present within any of the first portions of the paths. When such cyclic and successive activation of the first beam is employed a respective second beam may or may not be provided corresponding to each first beam. All that is strictly necessary in such a case is that each first portion defined by a corresponding first beam overlaps a second portion of the corresponding transponder path which is irradiated by a beam of radio energy which has a lower frequency and periodically carries the modulation having the specific nature; these second portions could in the limit all be irradiated by the same second beam.

According to another aspect the invention provides an information transmission system comprising a fixed radio station adjacent a path for mobile radio transponders and a plurality of mobile radio transponders situated on said path, said station comprising means for generating a first beam of microwave energy and a second beam of lower frequency radio energy and irradiating first and second overlapping portions of said path with said first and second beams respectively, said second beam periodically carrying modulation having a specific nature, and means for responding to reception of radio energy which is reflected by a said transponder, which has a frequency lower than said first frequency, and which is modulated in a specific manner, by modulating said second beam with a specific address code and for subsequently modulating further information in conjunction with said address code on said second beam, each transponder comprising enabling means for enabling that transponder for communication with the fixed station in response to reception by that transponder of energy from the first beam and means for responding, when so enabled, to reception of energy from the second beam carrying modulation having the specific nature by modulating its reflection of said radio energy having a frequency lower than said first frequency in said specific manner, for responding to subsequent reception of energy from the second beam modulated with a specific address code by storing said specific address code, and for responding to subsequent reception of modulated energy from the second beam provided that the modulation includes the stored address code.

According to yet another aspect the invention provides a transponder comprising enabling means for enabling that transponder for communication in response to reception of microwave energy having a first frequency, and means for responding, when so enabled, to reception of radio energy having a lower second frequency and carrying modulation having a specific nature by modulating in a specific manner its reflection of received radio energy having a frequency lower than the first frequency, for responding to subsequent reception of radio energy having the second frequency and modulated with a specific address code by storing said specific address code, and for responding to subsequent reception of modulated radio energy having the second frequency provided that the modulation includes the stored address code.

Figure 2:
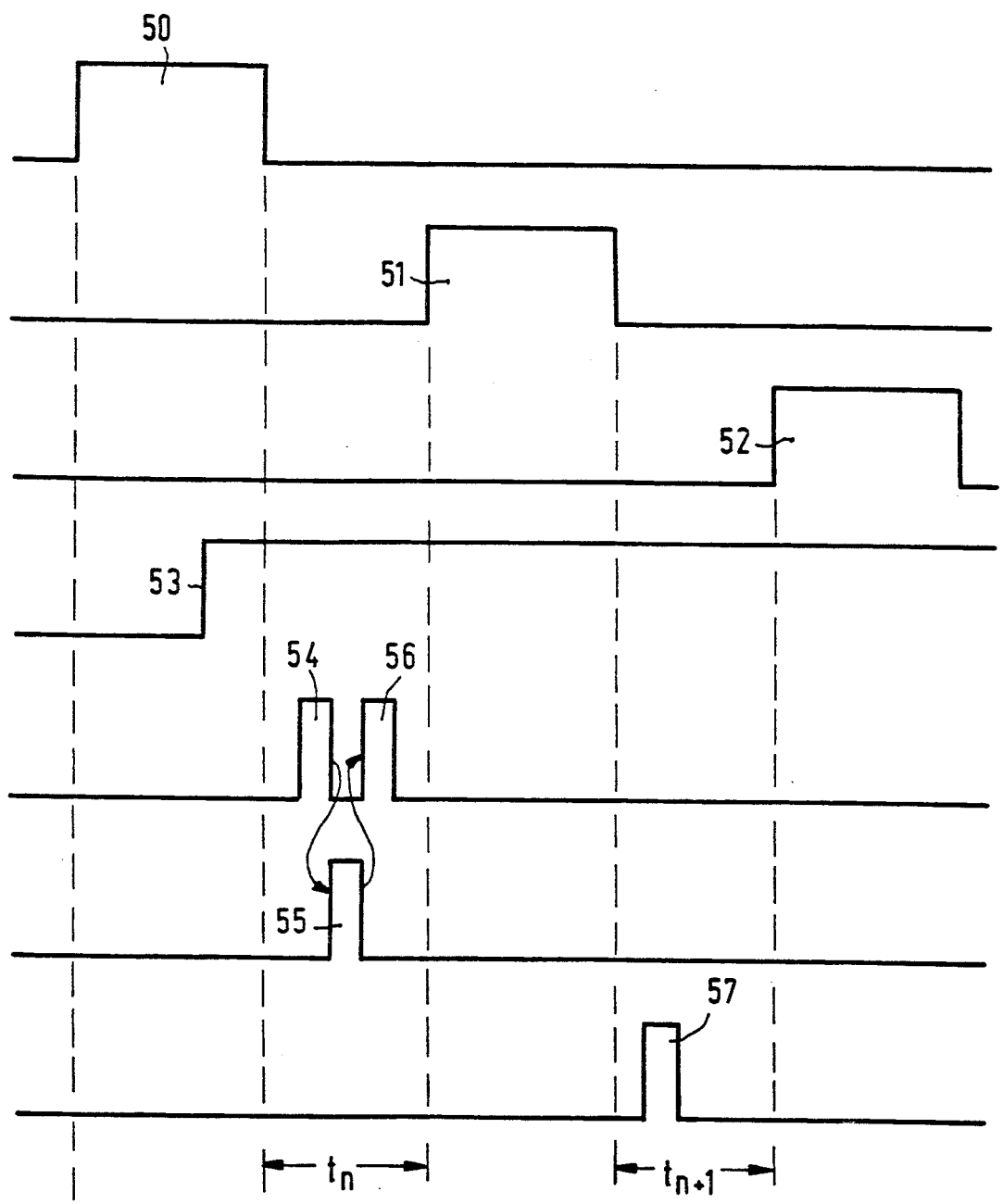
Figure 3:
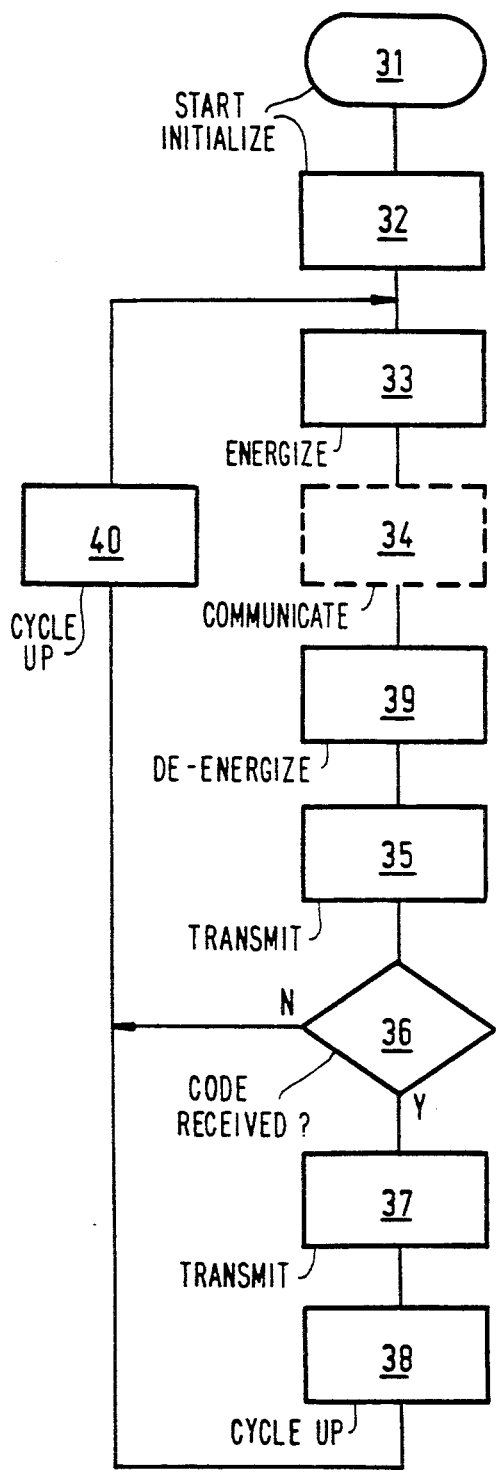
Figure 4:
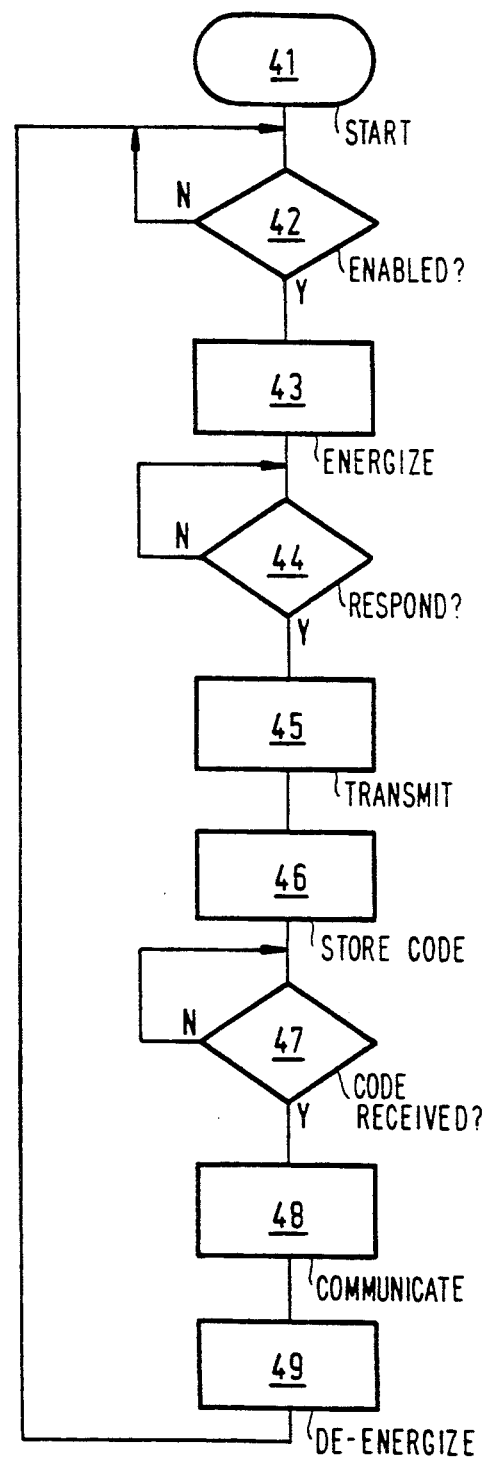

Embodiments of the invention will now be described, by way of example, with reference to the accompanying diagrammatic drawings in which:

FIG. 1 is a view from above of a one-way road carrying vehicles provided with transponders, which road has a communication station adjacent thereto, FIG. 2 illustrates the time relationship between various signals transmitted by the communication station and transponders of FIG. 1, FIG. 3 is a flow diagram showing a sequence of operations performed by the communication station of FIG. 1, and FIG. 4 is a flow diagram showing a sequence of operations performed by each transponder when enabled for communication with the station of FIG. 1.

FIG. 1 is a very diagrammatic view from above of a one-way road or carriage-way 1. The road nominally accommodates three traffic lanes 2,3 and 4, the arrows denoting the direction of traffic movement and the lane boundary markers being denoted by references 5 and 6 respectively. For the purpose of illustration two vehicles, denoted by symbolic blocks 7 and 8 respectively, are shown travelling along the road, the path of vehicle 7 lying in the lane 2 and the path of vehicle 8 straddling the lanes 3 and 4. The vehicles 7 and 8 carry transponders 9 and 10 respectively, also shown as symbolic blocks. These may be mounted, for example, adjacent the respective front windscreens, for example adjacent the rear view mirrors conventionally provided.

A gantry 11 is provided above the road 1, this gantry carrying radio aerials $A_0$-$A_4$, $B_0$-$B_2$ which are connected, via respective signal transmission paths shown collectively as a single path 21, to a station 22 adjacent the road 1. When the aerials $A_0$, $A_0$, $A_3$,$A_1$,$A_4$ and $A_2$ are energised by the station 22 the radio beams therefrom irradiate areas 23, 24, 25, 26 and 27 respectively of the road 1 with microwave energy having a first frequency which is preferably greater than 9 GHz, for example approximately 24 GHz. Similarly, when the aerials $B_0$, $B_1$ and $B_2$ are energised by the station 22 the radio beams therefrom irradiate areas 28, 29 and 30 respectively of the road 1 with radio energy having a second frequency which is lower than the first frequency and is preferably less than 3 GHz, for example approximately 2.4 GHz. In any case the ratio of the first frequency to the second frequency is preferably at least 3:1. The angle of incidence of these beams on the road may be, for example, approximately 60° to the normal to the road surface.

It will be noted that the road areas 23 and 28 constitute the road-level boundaries of overlapping (3-dimensional) portions of a path for the vehicle 7 on the road, which portions are irradiated with radio energy having the first frequency and radio energy having the second frequency, respectively, and the road areas 26 and 29 (and in fact also the road areas 26 and 30) constitute the road-level boundaries of overlapping portions of a path for the vehicle 8 on the road. Road-level boundaries of overlapping similarly radio-energy-irradiated portions of other paths for vehicles on the road are similarly constituted by the road areas 24 and 28, 24 and 29, 25 and 29, and 27 and 30. It will also be noted that the areas 23-27, and hence the irradiated vehicle path portions corresponding thereto, together cover substantially the whole width of the road so that the transponder in any transponder-carrying vehicle passing through the section of the road shown must pass through at least one of these portions and hence be exposed to the microwave energy in the relevant beam from the aerial $A_0$,$A_1$,$A_2$,$A_3$, or $A_4$ (provided of course that the relevant beam is energised at the appropriate time; in fact the beams from these aerials are energised successively and cyclically at a sufficient rate to ensure that such exposure must always take place). It will furthermore be noted that each of the areas 23-27 is approximately the same size as the area of road occupied by a vehicle, e.g. the vehicle 7 or 8, so that at most only one vehicle, and hence one transponder, can be present in the corresponding portion of the relevant vehicle path at any given time. Because, as mentioned above, the microwave beams from the corresponding aerials $A_n$ are energised cyclically and successively (so that only one is energised at any given time) this means that only one transponder can experience the microwave energy of the first frequency at any given time.

A transponder is provided in each vehicle travelling along the road 1 and is constructed so that it is enabled for communication with the road-side station 22 in response to it receiving microwave energy having the first frequency transmitted by the aerials $A_n$. As explained above, only one transponder can receive such energy from the aerials $A_n$ at any given time and hence only one transponder can become so enabled at any given time. This means that it can be ensured that any ensuing communications of information from enabled transponders to the station 22 do not clash with each other.

These communications are carried out using the radio energy having the (lower) second frequency emitted by the aerials $B_n$, communication of information by each transponder to the station 22 being achieved by that transponder modulating its reflection of this energy in accordance with the information to be communicated. (Communication of information in this way is disclosed, for example, in U.S. Pat. No. 4,075,632, which is incorporated herein by reference). The time relationship between certain of these communications and the energisations of the aerials $A_0$,$A_1$, ... is illustrated in FIG. 2 of the drawings in which 50 denotes a pulse of microwave energy emitted by a given aerial $A_n$, 51 denotes a pulse of microwave energy emitted by aerial $A_{n+1}$, and 52 denotes a pulse of microwave energy emitted by aerial $A_{n+2}$. Edge 53 denotes the enabling of a transponder which happens to be in the activation area corresponding to aerial $A_n$ when the pulse 50 is emitted, pulse 54 denotes a "hello" signal transmitted by the station 22 as modulation, having a specific nature, of the radio energy emitted by the aerial(s) B associated with the aerial $A_n$, i.e. by the or each aerial B which irradiates a portion of the same vehicle path which is irradiated by the aerial $A_n$, 55 denotes a "present" signal transmitted by the newly enabled transponder in response to its reception of the hello signal 54 (which effectively constitutes a "respond" command), and 56 denotes the transmission of an identification or address code to the newly enabled transponder by the station 22 suitably modulating the radio energy emitted by the aerial(s) B associated with the aerial $A_n$, this transmission being in response to the station 22 receiving the "present" signal 55. As implied previously, the "present" signal 55 is communicated by the newly enabled transponder modulating its reflection of the radio energy emitted by an aerial B associated with the aerial $A_n$. Similarly to pulse 54, pulse 57 denotes a "hello" signal transmitted by the station 22, but this time as modulation of the radio energy emitted by the aerial(s) B associated with the aerial $A_{n+1}$, and so on. It will be noted that the "hello" command 54 is transmitted within the interval $t_n$ between the pulses 50 and 51 (as indeed are the signals 55 and 56 but this has no significance) and this ensures, at least in theory, that it does not elicit a response from more than one transponder (enabled in different ones of the areas 23-27 of FIG. 1).

The net result of the communications 54, 55 and 56 is therefore that the transponder in a transponder-carrying vehicle entering the portion of road shown in FIG. 1, in particular the area of road irradiated by aerial $A_n$, is enabled for communication with the road-side station 22 and is assigned a respective address or identification code (which is stored in the relevant transponder) by means of which it can be subsequently communicated with selectively if required. As mentioned previously the various aerials A are activated cyclically and successively at a sufficient rate to ensure that all transponders entering the portion of road shown in FIG. 1 are so enabled and hence have temporarily assigned thereto (by means of respective sets of communications corresponding to communications 54, 55 and 56 of FIG. 2) respective address or identification codes by means of which they can subsequently be communicated with selectively if required. Any such subsequent communication from the station 22 to a given transponder is achieved by the station 22 suitably modulating at least the beam of radio energy emitted by the aerial(s) B associated with the relevant aerial A (and also possibly the beams of radio energy emitted by some or all of the other aerials B), and any such subsequent communication from the transponder to the station 22 is achieved by the transponder modulating its reflection of the radio energy emitted by an aerial B associated with the relevant aerial A or the radio energy emitted by another aerial B. Obviously these communications will have to be timed in such a way that they do not coincide with the subsequent intervals during which sets of "hello", "present" and address code messages are communicated to/from other transponders via the relevant aerial(s) B.

The relevant operations which may be performed by the station 22 and each transponder such as 9 and 10 are illustrated in the flow diagrams of FIGS. 3 and 4 respectively.

Ignoring for the moment the block 34 shown in FIG. 3 in dashed lines, the other blocks in this Figure (which relates to the station 22) have the following significances:

31-Start
32-Initialise. m,n:=0
33-Energise aerial $A_n$.
39-De-energise aerial $A_n$.
35-Transmit "respond" command from aerial(s) B associated with aerial $A_n$.
36-"Presence" code received?
37-Transmit address code m from at least the aerial(s) B which is/are associated with aerial $A_n$.
38-m:=m+1 modulo M.
40-n:=n+1 modulo S.

As implied previously, the various "aerial(s) B associated with aerial $A_n$" are defined as follows

| Aerial $A_n$ | Associated aerial(s) B |
|---|---|
| $A_0$ | $B_0$ |
| $A_1$ | $B_1$ |
| $A_2$ | $B_2$ |
| $A_3$ | $B_0$ and $B_1$ |
| $A_4$ | $B_1$ and $B_2$ | i.e. they are constituted by the or each aerial B which irradiates a portion of the same vehicle path which is irradiated by the relevant aerial A.

Thus, after start and initialisation the aerial $A_0$ is energised, enabling any transponder present in the vehicle path portion irradiated thereby for communication. After the operation(s) signified by the block 34 the aerial $A_n$ is de-energised after which a "respond" command is transmitted from the aerial $B_0$. It is then tested in step 36 (during which unmodulated carrier is transmitted from aerial $B_0$) whether this results in the communication of a "presence" code from a newly enabled transponder present in the vehicle path portion irradiated by the aerial $B_0$. If the result of this test is positive (Y) an address code "0" is transmitted from the aerial $B_0$ (and in fact is stored in the relevant transponder for further use), after which the next address code to be transmitted is prepared in step 38 and the number n is incremented in step 40. The cycle then repeats with respect to the aerials $A_1$ and $B_1$, and so on. If the result of test 36 is negative (N) the steps 37 and 38 are omitted. In any case the loop transversal time is sufficiently short that step 33 is performed with respect to every aerial $A_n$ sufficiently frequently to ensure that any vehicle traversing the path portion irradiated thereby must be irradiated at least once. The modulus M employed in respect of the incrementing operation in step 38 must, of course, be chosen sufficiently large to ensure that there is no chance of two enabled transponders which have been assigned the same address code being present within communication range of an aerial B at any given time.

Block 34 of FIG. 3 denotes communications between the station 22 and specific transponders to which respective address or identification codes have already been assigned by the process set forth hereinbefore, the relevant transponders being selectively addressed using the relevant codes and the communications taking place while these transponders are still in range of the aerials B.

It should be noted that, although five aerials A and three aerials B are shown irradiating corresponding areas 23-27 of the road 1 in FIG. 1, these numbers have been chosen merely for clarity's sake. In practice, for a three-lane road, seventeen aerials A and nine aerials B will be a more appropriate choice, nine of the aerials A irradiating a first line of areas extending across the width of the road similarly to the areas 23, 25 and 27 and the aerials B irradiating associated areas extending across the width of the road similarly to the areas 28-30 and the other eight of the aerials A irradiating a second line of areas staggered with respect to the areas of the first line, similarly to the areas 24 and 26. The areas irradiated by the aerials A may then each have a diameter of approximately 1 meter and be arranged to be each irradiated at least once every 5 milliseconds.

In FIG. 4 (which relates to each transponder such as the transponders 9 and 10 of FIG. 1) the various blocks have the following significances:

41- Start
42- Enabling signal received?
43- Power up communication circuits.
44- "Respond" command received?
45- Communicate "presence" code.
46- Store address code received
47- Stored address code received?
48- Store received information and/or communicate information.
49- Power down communication circuits.

Thus, each transponder is normally in a state of quiescence signified by the test 42. In this state its current consumption can be very low indeed, as all that is required is that some form of detector for the enabling signals transmitted by the station 22 from the aerials A be in an operational condition. When such an enabling signal is received (Y), which means that the relevant transponder has entered the beam from one of the aerials A, the transponder's communication circuits are powered up (operation 43), for example by using the detector output signal to operate an electronic switch connecting these circuits to a supply battery, after which the transponder awaits a "respond" command transmitted from the relevant aerial(s) B (test 44) by means of a step 35 of FIG. 2. In response to reception of such a command the transponder modulates its reflection of the beam from the relevant aerial(s) B in accordance with the "presence" code (step 45) and the station 22 responds to this by transmitting an address code from the relevant aerial(s) B (step 37 of FIG. 2), this being stored by the relevant transponder (step 46). The transponder then awaits (test 47) reception of this address code from the relevant aerial(s) B and, when this occurs (corresponding to one of the operations 34 of FIG. 3), reacts by storing information then received from the station 22 via the relevant aerial(s) B and/or by communicating information to the station 22 by suitably modulating its reflection of the radio energy received from the relevant aerial(s) B. This storage and/or communication can be controlled by means of appropriate codes transmitted by the station 22 from the relevant aerial(s) B.

In practice each transponder may be provided with a time-out mechanism, started in response to a positive result from test 42, to direct its state to the input of block 49 after a predetermined time has elapsed. In this way its internal supply battery can be prevented from being unnecessarily drained in the event of the loop of FIG. 4 failing to be completely transversed, for example because of a failure of communication at one of the stages 44-48. Such a time-out mechanism may be provided, for example, by coupling the aforesaid detector for the enabling signals to the energising switch for the communication circuits via a threshold-responsive monostable multivibrator (or the digital equivalent) in such manner that each output pulse of the multivibrator (triggered by reception of an enabling signal) closes the energising switch for the whole period during which it is present, this period being chosen to be equal to the required time-out period.

It will be evident that the sequences of operations set forth in FIGS. 3 and 4 may be performed under the control of appropriately programmed microprocessors included in the station 22 of FIG. 1 and each transponder, respectively. Alternatively they may be implemented completely by appropriate hardware configurations.

Although as described the beams from the aerials $A_0$-$A_4$ of FIG. 1 are energised one at a time, the radio energy in the beam from each aerial $B_0$-$B_2$ having the same frequency, this is not necessarily the case. If the beams from the aerials $B_0$-$B_2$ have different respective frequencies (all less than the frequency of the energy transmitted from the aerials A) this will allow simultaneous communications to be effected between the station 22 and a respective transponder present within each of these beams, without these communications interfering with each other. In such a case, in the simple example depicted in FIG. 1 the beams from at least the aerials $A_0$ and $A_2$ may be energised simultaneously, thereby at least in theory allowing two transponders to be enabled simultaneously but without the possibility of the resulting possibly simultaneous communications interfering with each other.

Although as described communications to transponders via the aerials $B_0$, $B_1$ and $B_2$ have the same carrier frequency as communications from transponders to these respective aerials (so-called half-duplex operation), this is not necessarily the case. Full duplex operation can be obtained by choosing the carrier frequencies used for the communications in the two directions to be different from each other (although all less than the frequency of the energy transmitted from the aerials A). In fact the communications in the two directions can even be effected by means of different radio beams radiated from respective aerials, a pair of such aerials then replacing each aerial $B_0$, $B_1$ and $B_2$ of FIG. 1.

In the embodiments so far described a respective address is temporarily assigned by the road-side station to each transponder, in order that subsequent communication between the road-side station and the various transponders can be on a selective basis. Such selectivity can alternatively be made possible by arranging that each transponder is assigned a unique identification code effectively permanently, this code being stored in the relevant transponder e.g. when it is manufactured. In such a case each newly-enabled transponder may be arranged to respond to a "hello" signal transmitted by the road-side station 22 not merely by transmitting a "present" signal but by actually transmitting its stored unique identification code, this code being used subsequently by the base station 22 to selectively communicate with the relevant transponder. Although this will reduce the number of messages initially travelling between the station 22 and each newly-enabled transponder from three to two, it might be considered undesirable from privacy considerations that specific identification codes which are permanently associated with respective transponders be received by the station 22. The temporary assignment of identification codes by the station, as previously described, will therefore be the technique often preferred in practice.

Although as described with reference to FIG. 3 each "respond" command (c.f. 54 in FIG. 2) is transmitted only from the or each aerial B which is associated with that aerial A which has been pulsed immediately previously, this being all that is strictly necessary if the command is to be received by the relevant transponder, it will be evident that there is no inherent reason why these commands should not be transmitted by some or all of the other aerials B too; in the limit all the aerials B may be operated in parallel, both in respect of the various "hello" signals and of all the subsequent communications. In such a case the various aerials B may be replaced by a single aerial which irradiates the totality of the areas 28, 29 and 30 of FIG. 1. However, providing one or more specific aerials B associated with each aerial A and using only the associated aerial(s) B to achieve at least each given set of "hello", "present", and address code communications which follow pulsing of a given aerial A allows the other aerials B to be used simultaneously for other purposes, e.g. the communications signified by block 34 in FIG. 2.

The microwave energy emitted by each aerial A preferably carries specific modulation to distinguish it from other microwave energy of substantially the same frequency which may also be present in the environment. Thus, for example it may be continuously amplitude-modulated with a low-frequency signal of, for example, 10 KHz, and each transponder may include an amplitude demodulator followed by a narrow-bandpass filter tuned to this frequency, the transponder being enabled for communication only in response to an output signal of at least a predetermined threshold level from the filter. This can prevent the various transponders from being enabled for communication by extraneous radiation, e.g. from microwave ovens, which if the enabling process includes the powering up of transmission and reception circuits for operating with the radio energy emitted by the aerials B, would entail unnecessary and undesirable power consumption. Obviously it is not essential that the enabling process includes such powering-up; it may consist merely in the transponder entering a state in which it is primed to respond to reception of a "hello" signal by transmitting a "present" signal.

Although the invention has been described in the context of communication between transponders carried by vehicles on a road and a station adjacent the road, it will be evident that other contexts are also possible within the scope of the invention as defined by the claims.

From reading the present disclosure, other modifications will be apparent to persons skilled in the art. Such modifications may involve other features which are already known in the design, manufacture and use of radio communication systems and methods and component parts thereof and which may be used instead of or in addition to features already described herein. Although claims have been formulated in this application to particular combinations of features, it should be understood that the scope of the disclosure of the present application also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention. The applicants hereby give notice that new claims may be formulated to such features and/or combinations of such features during the prosecution of the present application or of any further application derived therefrom.

We claim:

1. An information system for communicating information by radio between mobile transponders and a fixed station, in which system the station irradiates first and second portions of a path for said transponders by a first beam of microwave energy and a second beam of radio energy respectively, said beams having first and second frequencies respectively, the microwave beam having the first frequency activates each said transponder for communication when that transponder is present within the first portion, information is subsequently communicated from that transponder to the station, and information is communicated to that transponder from the station by the station modulating the second beam, characterized in that said first and second portions overlap, said second frequency is lower than said first frequency, communication of information from each activated transponder to the fixed station is achieved by the activated transponder modulating and reflecting a beam of radio energy with which the station irradiates said second portion, which reflected radio beam has a frequency which is lower than said first frequency, said second beam periodically carries modulation containing information, information is first communicated to the station by any newly enabled transponder in response to reception by that transponder of the modulation containing information, a specific address code is communicated between the station and each newly enabled transponder, and the station subsequently modulates said second beam to communicate further information to each enabled transponder using the specific address code to address the relevant transponder.

2. A system as claimed in claim 1, wherein the communication of the specific address code is from the station to the newly enabled transponder in response to reception by the station of the first communicated information from that transponder.

3. A system as claimed in claim 1, wherein the beam which is modulated and reflected and said second beam are one and the same.

4. A system as claimed in claim 1, wherein said first frequency is at least three times said second frequency.

5. A system as claimed in claim 4, wherein said first frequency is greater than 9 GHz and said second frequency is less than 3 GHz.

6. A system as claimed in claim 1, performed with respect to each of a plurality of mutually adjacent paths for mobile transponders, a respective said first beam being provided corresponding to each said path.

7. A system as claimed in claim 6, wherein the respective first beams are activated cyclically and successively with intervals therebetween.

8. A system as claimed in claim 7, wherein said modulation containing information is carried by a said second beam in each interval between successive activation periods of the first beams.

9. An information transmission system as claimed in claim 1, comprising a fixed radio station adjacent a path for mobile radio transponders and a plurality of mobile radio transponders situated on said path, said station comprising means for generating a first beam of microwave energy and a second beam of lower frequency radio energy and irradiating first and second overlapping portions of said path with said first and second beams respectively, said second beam periodically carrying modulation containing information, and means for responding to reception of radio energy which is reflected by a said transponder, and said second beam is modulated specifically by modulating said second beam with a specific address code and for subsequently modulating further information in conjunction with said address code on said second beam, each transponder comprising enabling means for enabling that transponder for communication with the fixed station in response to reception by that transponder of energy from the first beam and means for responding, when so enabled, to reception of energy from the second beam carrying modulation containing information by modulating and reflecting said radio beam, for responding to subsequent reception of energy from the second beam modulated with a specific address code by storing said specific address code, and for responding to subsequent reception of modulating energy from the second beam provided that the modulation includes the stored address code.

10. A fixed station for communicating with mobile transponders traveling along a path, comprising:
first means for irradiating a first portion of a path with a first beam of microwave energy at a first frequency, said first portion being sufficiently small that only one transponder is irradiated at one time, second means for irradiating a second portion of said path with a second beam of microwave energy at a second frequency, and means for controlling said first means to transmit said first beam for a first given period of time, and for controlling said second means to modulate said second beam for a period of time after said first given period of time, characterized in that said second frequency is lower than said first frequency, said second portion overlaps said first portion, and said station further comprises means for communicating a specific address code between said transponder and said station, and means, using said specific address code to address said transponder, for modulating said second beam to communicate further information to said transponder.

11. A station as claimed in claim 10, characterized in that said means for communicating comprises means, responsive to receipt of a first communication from said transponder following transmission of said first beam for said first given period of time, for transmitting said specific address code by said station by modulating said second beam.

12. A station as claimed in claim 10, characterized in that said first frequency is at least three times said second frequency.

13. A station as claimed in claim 10, characterized in that said first frequency is greater than 9 GHz and said second frequency is less than 3 GHz.

14. A station as claimed in claim 10, comprising a first plurality of said first means, each first means irradiating a respective first portion of a respective one of a corresponding first plurality of mutually adjacent paths, and said means for controlling causes said first beams to be transmitted cyclically and successively, with intervals therebetween for transmitting said second beam.

15. A station as claimed in claim 14, comprising a second plurality of second means, said second plurality being less than said first plurality, and each second means irradiating a second portion of at least two adjacent paths.

16. A transponder for communicating with a fixed station, while traveling along a path, comprising:

means for receiving a first microwave signal at a first frequency, means for radiating modulated microwave energy at a second frequency lower than said first frequency responsive to receipt of a microwave signal at said second frequency, said means for radiating being controllable to be alternatively enabled and nonenabled, means responsive to receipt of said first microwave signal for enabling said means for radiating, and means for communicating a specific address code between the transponder and said station, and means for storing said specific address code at the location to which the specific address code has been communicated.

17. A transponder as claimed in claim 16, characterized in that said means for radiating reflects modulated microwave energy at said second frequency.

18. A transponder as claimed in claim 16, comprising means, effective after communication of said specific address code, for responding to subsequent reception of modulated energy at said second frequency only when the modulated energy includes the stored address code.

* * * * *